United States Patent
Sen et al.

(10) Patent No.: US 6,824,163 B2
(45) Date of Patent: Nov. 30, 2004

(54) AIRBAG MODULE

(75) Inventors: Hasan Sen, Rüsselsheim (DE); Udo Bönsch, Mühltal (DE); Rolf Sawal, Frankfurt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 75 days.

(21) Appl. No.: 10/290,313

(22) Filed: Nov. 8, 2002

(65) Prior Publication Data

US 2003/0146604 A1 Aug. 7, 2003

(30) Foreign Application Priority Data

Feb. 5, 2002 (DE) .......................................... 102 04 642

(51) Int. Cl.⁷ .............................................. B60R 21/16
(52) U.S. Cl. ................................................. 280/728.2
(58) Field of Search ........................ 280/728.2, 728.1, 280/731, 732, 743.1

(56) References Cited

U.S. PATENT DOCUMENTS

| | | | | |
|---|---|---|---|---|
| 4,986,569 A | * | 1/1991 | Bruton ..................... | 280/728.2 |
| 5,263,739 A | * | 11/1993 | Webber et al. ........... | 280/728.2 |
| 5,454,588 A | * | 10/1995 | Rose ........................ | 280/728.2 |
| 5,560,643 A | | 10/1996 | Lang et al. ............... | 280/728.2 |
| 5,577,763 A | | 11/1996 | Cuevas ..................... | 280/728.2 |
| 5,592,729 A | * | 1/1997 | Dyer et al. ................. | 29/464 |
| 5,709,402 A | * | 1/1998 | Leonard ................... | 280/728.2 |
| 5,755,459 A | * | 5/1998 | LaLonde ................... | 280/728.3 |
| 5,931,491 A | | 8/1999 | Bosgeiter et al. ........ | 280/728.2 |
| 5,944,344 A | * | 8/1999 | Yoshioka et al. .......... | 280/740 |
| 6,199,895 B1 | | 3/2001 | Seymour .................. | 280/728.2 |
| 6,248,052 B1 | | 6/2001 | Kleeberger et al. ...... | 493/374 |
| 6,279,949 B1 | | 8/2001 | Braunschadel ........... | 280/739 |
| 2003/0230873 A1 | * | 12/2003 | Bayer ....................... | 280/728.2 |

FOREIGN PATENT DOCUMENTS

| | | |
|---|---|---|
| DE | 19536625 | 3/1997 |
| DE | 29907607 | 11/1999 |
| DE | 19831613 | 1/2000 |
| DE | 10013774 | 9/2000 |
| EP | 0376564 | 12/1989 |
| WO | WO 00/15467 | 3/2000 |

* cited by examiner

*Primary Examiner*—Faye M. Fleming
(74) *Attorney, Agent, or Firm*—Lonnie Drayer

(57) ABSTRACT

An airbag module has a base plate, an inflator and an airbag. To manufacture the airbag module in the most cost effective manner, the airbag is attached to the base plate or the inflator with a clamping connection. The inflator is attached to the base plate by a clamping connection. Alternatively, at least one through opening is located in the base plate, a through opening via which during the manufacture of the airbag module at least one bar can be inserted, to stretch the airbag fastened to the base plate prior to folding the airbag.

9 Claims, 4 Drawing Sheets

AIRBAG MODULE

FIELD OF THE INVENTION

The invention relates to an airbag module with a base plate, an inflator and an airbag. A procedure for stretching an airbag on a base plate of an airbag module before its folding is also disclosed.

BACKGROUND OF THE INVENTION

So-called four-part driver airbag modules are known, during the manufacture of which an airbag is secured to a retainer ring and subsequently folded. Prior to the folding initially a first tube is inserted through the retainer ring into the airbag, to stretch the latter. Then at least one second tube is pushed over the airbag from the outside. Subsequently the airbag is folded using a piston, which is shifted into the second tube. A so-called scrunch folding of the airbag takes place in the second tube. The retainer ring is later connected to the inflator and closed by the latter in the stretching direction of the airbag.

More recent developments of airbag modules have tended towards a three-part airbag module, in which the inflator and the retainer ring are made as one piece. In an airbag module of this type the retainer ring is closed in the stretching direction of the airbag by the inflator. No first tube can therefore be inserted through the retainer ring into the airbag, to achieve a scrunch folding. The airbag must in an intermediate step, be secured and folded to a retainer-like ring. The folded airbag can only then be detached from the retainer-like ring and secured to the inflator.

The detachment and renewed securing entails high technical requirements and also cancels out the procedure simplification due to the reduction of the number of parts to three.

SUMMARY OF THE INVENTION

There is provided in accordance with the present invention an airbag module comprising a hat shaped base plate, a disk shaped gas producing inflator and an airbag, the airbag having a hem section or collar section; wherein the airbag is attached to the hat shaped base plate or the disk shaped gas producing inflator with an encircling clamping connection at the airbag hem section or collar section the clamping connection comprising an annular ring groove and a ring-shaped traction element arranged therein forming an essentially gas tight connection between the airbag and the gas producing inflator of the airbag module over the entire periphery.

There is provided in accordance with another aspect of the invention an airbag module comprising a base plate, an inflator and an airbag, wherein the base plate has at least one opening therethrough, through which during the manufacture of the airbag module at least one bar can be inserted, to stretch the airbag fastened to the base plate prior to its folding.

The present invention provides an airbag module, the manufacture of which is simpler and more cost effective in comparison to known procedures. In particular the airbag of the airbag module is to be able to be folded in accordance with the scrunch procedure.

In the airbag module according to the invention, the airbag is secured to the base plate or the inflator by a clamping connection. The clamping connection the airbag can be secured to the base plate or the inflator in a simple, cost effective manner with subsequent detachment. The previously technically demanding detaching of the folded airbag and renewed securing to a base plate or the inflator is thus significantly simplified according to the invention.

DETAILED DESCRIPTION OF THE INVENTION

Figure 1:
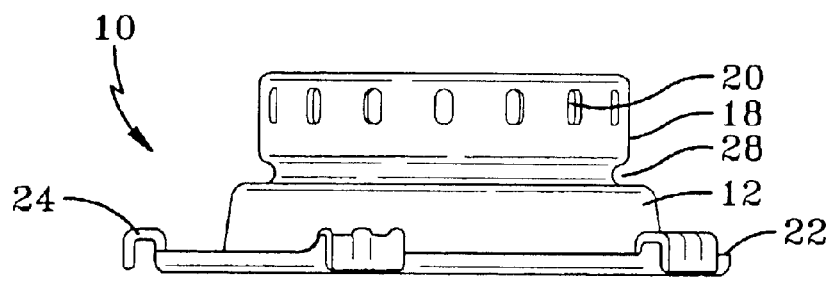
FIG. 1 is a side view of a base plate of a first embodiment of an airbag module according to the invention.
Figure 2:
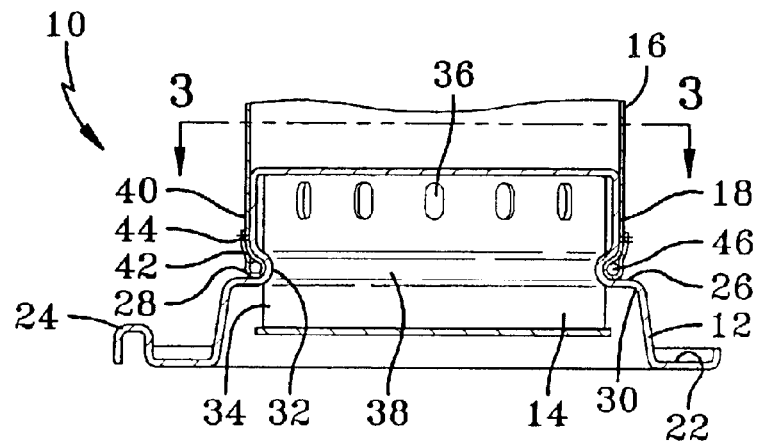
FIG. 2 is a cut-off side view according to FIG. 1 with an inflator arranged on the base plate.
Figure 3:
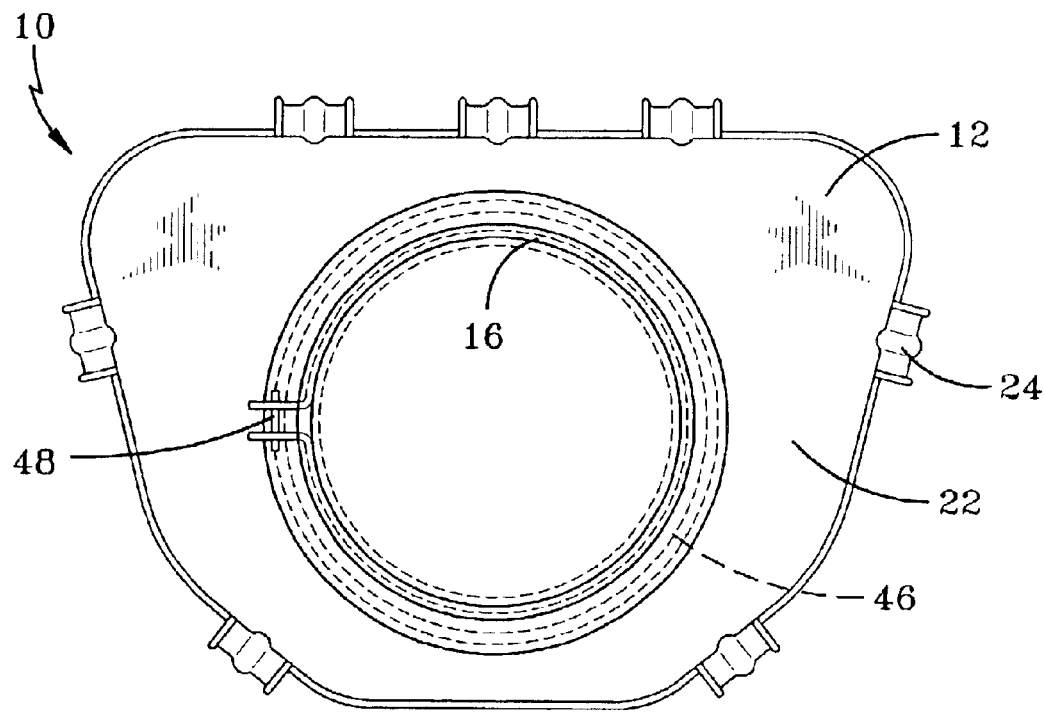
FIG. 3 is a top view, taken in section along line 3—3 of FIG. 2, of the airbag module shown in FIGS. 1 and 2.

FIGS. 1 to 3 show a first embodiment of an airbag module 10 with a base plate 12, an inflator 14 and an airbag 16.

The base plate 12 is a thin-walled essentially hat-shaped sheet metal part. The base plate can be a diffuser. The base plate comprises a cylindrical section 18, on the upper border of which openings 20 are arranged in a regular distribution over the periphery. The cylindrical section 18 is connected to a flange section 22, on the outer border of which a total of seven hooks 24 are arranged. The hooks 24 serve to secure a not represented cover of the airbag module 10, after the attachment of the inflator 14 and the airbag 16 to the base plate 12.

The base plate 12 comprises at its outer side 26, in approximately the middle of the cylinder section 18, a ring groove 28. On the inner side 30 opposite the outer side 26, a ridge 32 mates with the ring groove 28. The ring groove 28 as well as the ridge 32 are formed on the thin-walled sheet metal structural part of the base plate 12 in one single manufacturing cycle by pressing. The manufacturing costs of the airbag module according to the invention can be reduced by the base plate being a thin-walled structural part, on a first side, preferably the outer side, of which the clamping connection of the airbag is arranged and on a second side, opposite to the first side, preferably the inner side, of which the clamping connection of the inflator is arranged. This type of thin-walled structural part can be manufactured very cost effectively by a sheet metal pressing process and simultaneously creates the basis for the two clamping connections provided in accordance with the invention.

FIG. 2 illustrates the inflator 14 arranged and supported on the base plate 12. This inflator 14 is essentially disc-shaped and its outer periphery is in the shape of a cylinder section 34. Openings 36 are arranged on the latter in the upper area, with reference to FIG. 2, of openings 36 which are arranged congruently with the openings 20 after an arrangement of the inflator 14 to the base plate 12. Gas for inflating the airbag 16 can flow through the openings 36 or 20 during the operation of the inflator 14. The inflator can be assembled to the base plate crimping. To keep the number of parts of the airbag module according to the invention to a minimum, the inflator can comprise a housing that is one piece with the base plate.

In a preferred embodiment of the invention, the inflator is secured to the base plate with a clamping connection. This connection can be created during the manufacture of the airbag module in a particularly cost effective as well as safe manner. In the middle of the cylinder section 34 a peripheral groove 38 is arranged on the inflator 14. The peripheral groove 38 is designed in such a manner that the ridge 32 arranged on the base plate 12 works in conjunction with it, to create a clamping connection for supporting the inflator 14 on the base plate 12.

To ensure a permanent connection of the airbag in the area of the clamping connection, the airbag can be reinforced in particular by additional fabric layers. The airbag 16 illustrated in FIG. 2 has a hem section or a collar section 40, to which a not further represented, essentially ball-shaped and altogether sealed section of the airbag 16 connects. To the hem section 40, at the periphery, a pocket 42 is formed, which is bordered by the hem section 40 and is foreseen with a seam 44 at a distance from its edge. In the pocket 42, a ring-shaped traction element 46, in approximately the shape of a pipe or hose clamp, is arranged. The ring-shaped traction element 46 is provided with a prestressing element 48 (see FIG. 3), to pull it together and to thereby clamp the hem section 40 of the airbag 16 on the outer side 26 of the base plate 12 in the ring groove 28. In this embodiment, at the hem section of the airbag an essentially gas tight connection between the airbag and the gas producing unit of the airbag module is ensured over the entire periphery. There is thus no need to sew in the traction element.

The ring-shaped traction element can alternatively or additionally engage a synthetic ring, which is connected, in particular cast with the airbag. Bearing surfaces and sealed surfaces for the ring-shaped traction element and for the base plate or the inflator can be precisely arranged on the synthetic ring.

During the clamping of the ring-shaped traction element 46, the hem section 40 of the airbag 16 is held in the ring groove 28 in a non-positive as well as positive locking manner. The ring-shaped traction element 46 can be correspondingly secured to the prestressing element 48 and opened again in a simple manner. In this way the ring-shaped traction element 46 can be used as a retainer-like ring, to provide the airbag 16 with a so-called scrunch folding and subsequently clamp it to the base plate 12.

In FIGS. 4 to 8, a second embodiment of an airbag module 10 is illustrated, which is similar to the embodiment represented in FIGS. 1 to 3 with reference to the base plate 12, the inflator 14 and the airbag 16.

The foreseen ring-shaped traction element can be arranged, in particular sewn into a ring-shaped pocket of the airbag. The ring-shaped traction element can in this case be sufficiently stable, such that, during the scrunch folding, it can replace a previously used retainer-like ring. A sewn-in traction element is particularly easy to assemble and in addition, cannot be lost during the assembly.

Figure 4:
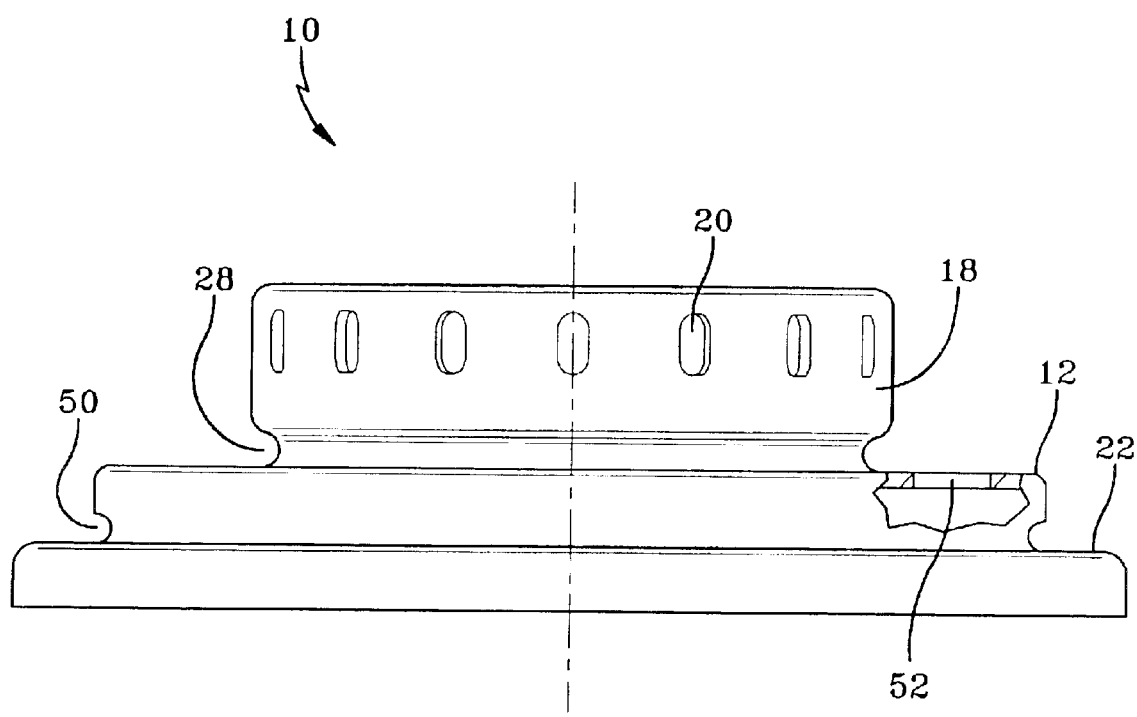
FIG. 4 is a side view of a base plate of a second embodiment of an airbag module according to the invention.

In the embodiment according to FIG. 4, however, the flange section 22 of the base plate 12 has two flanges and, alongside the ring groove 28, has a second ring groove 50 at a second flange. Analogous to the embodiment according to FIGS. 1 to 3, a not represented hem section of an airbag is secured in this ring groove 50 by a ring-shaped traction element.

Radially within this ring-shaped traction element, four through openings 52 are arranged in a regular distribution over the periphery on the flange section 22. During the manufacture of the airbag module 10, in each case a bar 54 can be inserted through each of these through openings 52, which bars are secured to a pushing device 56. With reference to FIGS. 4 to 8, the bars 54 can also be inserted from below through the through openings 52 in the pushing direction indicated by arrow A into the unfolded airbag 16. This is possible even when the base plate 12 is essentially sealed in the pushing direction and already has an inflator 14 pre-assembled on it.

Prior to the insertion of the bars 54, the airbag 16 illustrated in FIGS. 5 to 8 is initially unfolded on a support. At the hem section 40, altogether four links 58 are arranged on it, supported in each case on one of the through openings 52 on the upper side of the flange section 22.

In addition, in the airbag 16 two traction bands 60 are arranged, which limit the movement of the inflation of an outer skin 62 of the airbag 16 after ignition of the inflator 14.

Figure 6:
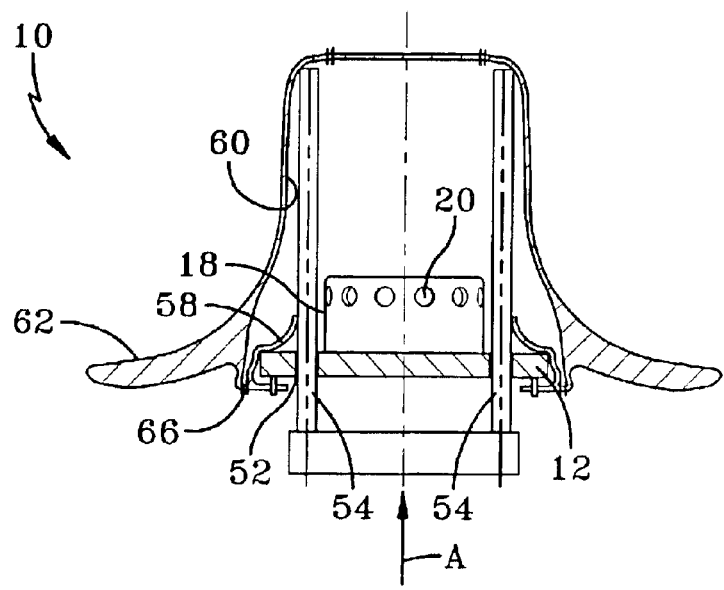
FIG. 6 is a side view of the airbag module shown in FIG. 5 during a second manufacturing step.

FIG. 6 illustrates how the bars 54 are inserted into the airbag 16 during the manufacture of the airbag module, to stretch the airbag 16 to prepare it for a subsequent, not represented, folding procedure. During the insertion of the bars 54 through the through openings 52, the links 58 of the airbag 16 are raised. With reference to FIG. 6, the outer skin 62 is moved into the pushing direction indicated by arrow A, until the traction bands 60 are essentially stretched.

Figure 5:
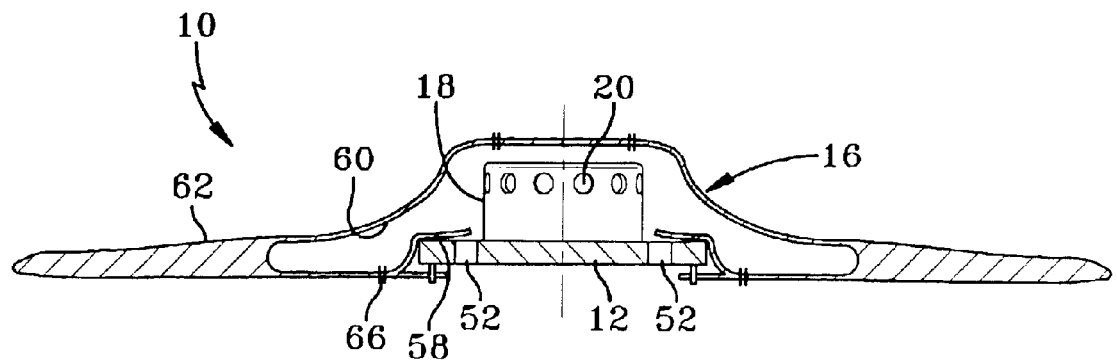
FIG. 5 is a further simplified side view of an airbag module according to FIG. 4 during a first manufacturing step.
Figure 7:
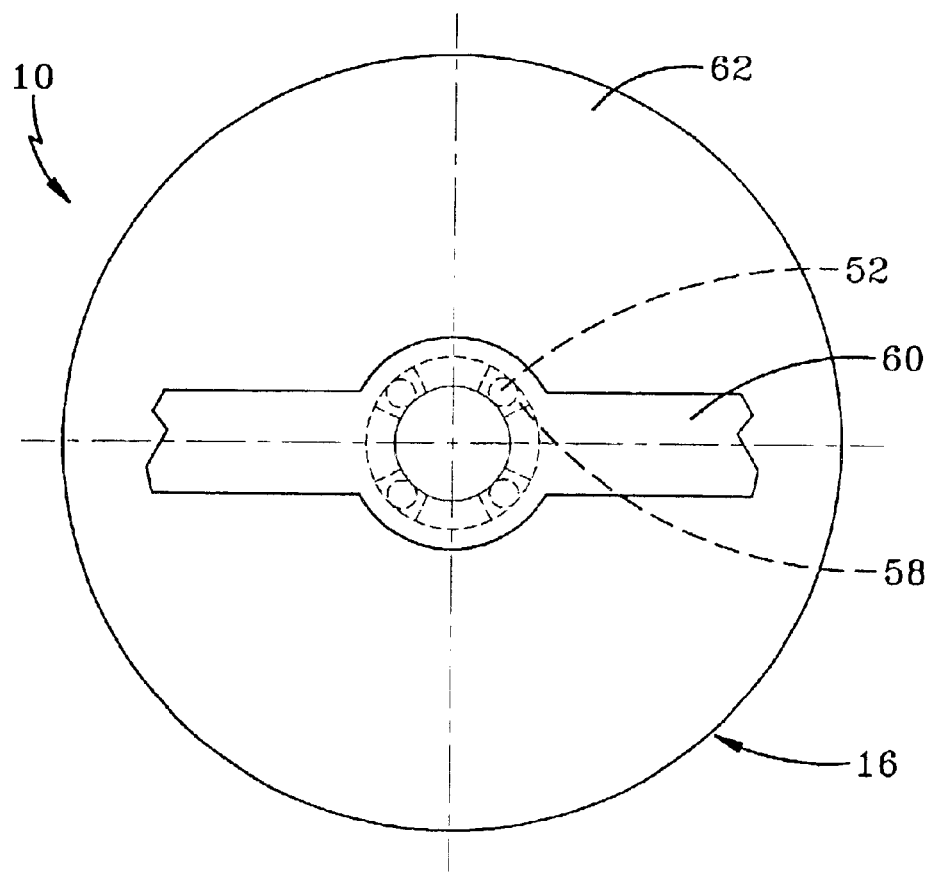
FIG. 7 is a top view of the airbag module shown in FIG. 5.

As can be seen in particular from FIGS. 5 to 7, the links 58 and the traction bands 60 are produced from one single fabric layer, which is secured to the outer skin 62 by a seam 66.

The through openings are arranged and designed in such a manner that, in a subsequent assembly of the airbag module to a vehicle, the through openings are essentially sealed in a gas tight manner. A separate seal of the through opening can in this case be dispensed with. Alternatively or additionally, links can be foreseen on the airbag of the airbag module, which seal the through opening, in particular during the ignition and inflation of the airbag. The through openings provided according to the invention can display a cross section adapted to the cross section of the bars that are to be inserted. Of particular advantage are round, L-shaped and circular shaped cross sections of the through openings.

Figure 8:
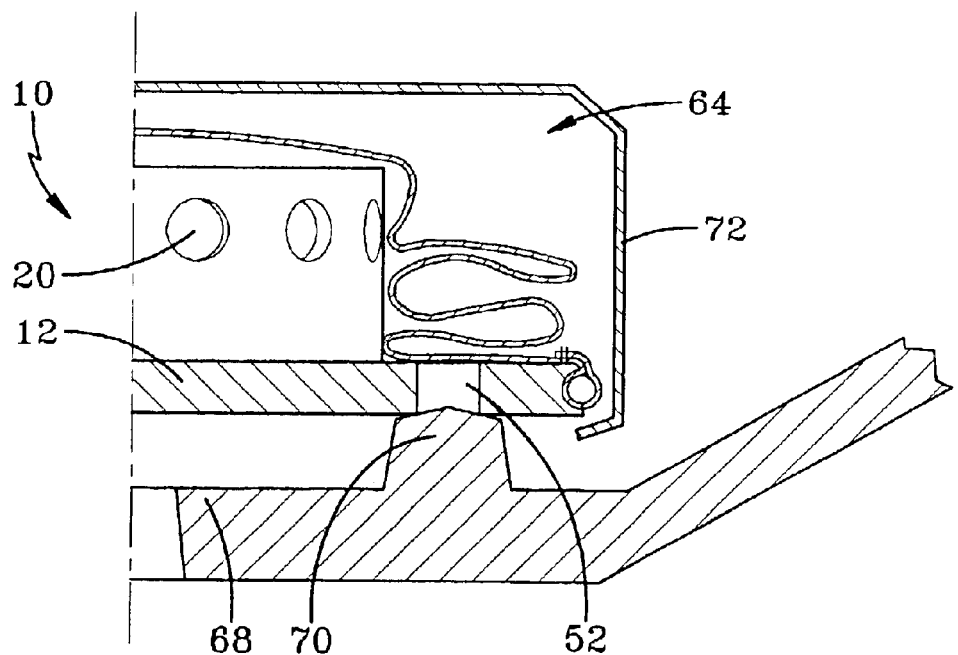
FIG. 8 is a partial sectional view of the airbag module shown in to FIG. 5 module mounted on a steering wheel.

FIG. 8 illustrates an airbag module 10 mounted to a steering wheel base 68. The steering wheel base 68 is foreseen with sealing knobs 70, which are congruent with the through openings 52 arranged in the base plate 12. The sealing knobs 70 create a support for the base plate 12 and at the same time seal the through openings 52 arranged in the base plate 12 in the assembled state of the airbag module 10. To this effect the sealing knobs 70 are conically shaped on their upper side and, if applicable, elastic. FIG. 8 also illustrates a cover 72 hooked into the base plate 12.

The through openings 52 can also be used as ventilation openings for the reduction of the internal airbag pressure in a crash. In this type of embodiment, the sealing knobs 70 are thus dispensed with.

In accordance with the invention, the clamping connection can be located on the base plate as well as directly on the inflator. In each case a rapid detaching and securing of the airbag is possible. The clamping connection according to the invention can be adapted to different airbag module variations with little effort. Moreover the clamping connection ensures a permanent and secure connection between the airbag and the inflator.

While the preferred embodiment of the present invention has been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims.

We claim:

1. An airbag module comprising a hat shaped base plate, the hat shaped base plate having a cylindrical section, a disk shaped gas producing inflator, the disk shaped gas producing inflator having a cylindrical outer periphery, and an airbag, the airbag having a hem section or collar section, wherein the airbag is attached to the hat shaped base plate or the disk shaped gas producing inflator with an encircling clamping connection at the hem section or collar section the clamping connection comprising an annular ring groove located in the cylindrical section of the base plate or on the cylindrical outer periphery of the inflator and a ring-shaped traction element arranged therein forming an essentially gas tight connection between the airbag and the gas producing inflator of the airbag module over the entire periphery.

2. The airbag module according to claim 1, wherein the inflator comprises a housing, which is formed as one place with the base plate.

3. The airbag module according to claim 2, wherein the ring-shaped traction element is sewn into, a ring-shaped pocket of the airbag.

4. The airbag module according to claim 2, wherein the ring-shaped traction element engages a synthetic ring that is connected with the airbag.

5. The airbag module according to claim 1, wherein the ring-shaped traction element is sewn into, a ring-shaped pocket of the airbag.

6. The airbag module according to claim 1, wherein the ring-shaped traction element engages a synthetic ring that is connected with the airbag.

7. The airbag module according to claim 1, wherein the base plate is a diffuser.

8. The airbag module according to claim 1, wherein the base plate is a thin-walled structural part, on a first side, preferably the outer side, of which the clamping connection of the airbag is arranged and on a second side, opposite to the first side, preferably the inner side, of which the clamping connection of the inflator is arranged.

9. The airbag module according to claim 8, wherein the thin-walled structural part of the base plate, on one of the sides a groove is present and that, accordingly, on the opposite side, a ridge is present, whereby in the groove a clamping element for the airbag is arranged, and on the ridge a groove of the inflator is arranged to create a clamping connection.

* * * * *